Dec. 1, 1959 E. S. PARSONS ET AL 2,915,090
METHOD OF AND MEANS FOR OBTAINING UNIFORMITY
OF TUFT LENGTH IN AXMINSTER FABRICS
Filed June 11, 1953 6 Sheets-Sheet 1

Inventors
Edgar S. Parsons
James H. Johnson
Alfred J. de Gozzaldi
by Roberts, Cushman & Grover
Att'ys.

Inventors
Edgar S. Parsons
James H. Johnson
Alfred J. de Gozzaldi
by Roberts Cushman & Green
Att'ys.

Dec. 1, 1959    E. S. PARSONS ET AL    2,915,090
METHOD OF AND MEANS FOR OBTAINING UNIFORMITY
OF TUFT LENGTH IN AXMINSTER FABRICS
Filed June 11, 1953    6 Sheets-Sheet 5

Inventors
Edgar S. Parsons
James H. Johnson
Alfred J. deGozzaldi

Inventors
Edgar S. Parsons
James H. Johnson
Alfred J. de Gozzaldi
by Roberts Cushman & Grover
att'ys.

United States Patent Office 2,915,090
Patented Dec. 1, 1959

2,915,090

METHOD OF AND MEANS FOR OBTAINING UNIFORMITY OF TUFT LENGTH IN AXMINSTER FABRICS

Edgar S. Parsons, Natick, and James H. Johnson and Alfred J. de Gozzaldi, Framingham, Mass., assignors, by mesne assignments, to Shawmut Engineering Company, Boston, Mass., a corporation of Massachusetts Application June 11, 1953, Serial No. 360,896

35 Claims. (Cl. 139—8)

This invention pertains to looms for use in the weaving of tufted or pile fabrics, such for example as Axminster, and relates more especially to a novel method of and apparatus for use in obtaining uniformity of tuft length. In Axminster looms, spools of tufting yarn are rotatably mounted in "tube frames" which in turn are carried by intermittently moving endless conveyor chains for presentation one-after-another at the weaving point.

Before commencing the weaving operation, each of the long series of tube frames is provided with a spool or spools varrying tuft yarn. On each of these spools is a plurality of tufting yarns, corresponding in number to the number of tubes to be supplied by the spool (for example one hundred), all simultaneously wound, the winding operation being carefully performed in order to insure that each yarn on the spool will be wound with substantially the same tension and to insure that each spool will carry yarn of the same length, for example forty feet, that is to say, sufficient to last during the entire weaving operation.

While the tube frames are being carried by the conveyor, the spools on the frames are prevented from rotating by appropriate means, for example brake devices. When the foremost tube frame of the series arrives at the weaving point the conveyor chain dwells and the foremost tube frame is automatically removed from the chains by so-called "clutch devices" which engage opposite ends respectively of the tube frame and support the latter while moving the tube frame through the "weaving-in cycle", during which the tufting yarns are locked into the body fabric and cut off, after which the tube frame is restored to the chains.

It is highly desirable that the tuft yarns which collectively constitute the pile surface of the completed fabric be cut to uniform length as they are incorporated in the fabric, for if they be of different lengths, the pile surface will be uneven and unsightly and must be sheared to provide a smooth surface, thus decreasing the depth of the pile to a degree which may be sufficient substantially to lower the sales value of the fabric. In any event, the sheared-off ends of the pile tufts represent a waste of expensive material. In the endeavor to insure uniformity of tuft lengths, it has heretofore been proposed to supply each spool with a brake device, thereby to tension the tufting yarn as it is drawn off from the spool during the weaving-in operation. Since the provision of braking devices for each individual spool of the long series of spools employed involves very substantial expense, and because it is difficult to keep the brake devices of all spools adjusted to apply the same effective braking force, it has been proposed as an alternative to mount spool braking means on the clutch devices in such a way that the same braking means will cooperate with each successive spool as the frames are taken and held by the clutch devices during the weaving-in operation. This latter arrangement is relatively simple and might be expected to apply approximately the same degree of braking pressure to each successive spool of the series. However, none of the prior arrangements completely solves the problem of insuring uniformity of tuft length for the reason that, at best, such prior braking devices apply the same braking force to the spool regardless of the diameter of the yarn mass on the spool.

When, during the weaving-in cycle, the tube frame is lifted to draw off yarn from the spool (the ends of the tufting yarns from said frame being now locked into the body fabric) the yarn is tensioned by the effort required to turn the spool. At the beginning of the weaving operation the geometric lever arm through which the yarn acts to turn the spool is the radius of the original yarn mass. As the yarn is used up, this radius decreases, with resultant increase in yarn tension which, in turn, produces a difference in the length of tufting yarn drawn off from the spool and this difference in length may be so great as to necessitate excessive shearing.

The principal object of the present invention is to provide a novel method of and means for insuring uniformity of yarn tension and therefore of tuft length. A further object is to provide novel means for applying braking force to the tufting yarn spool in such a way as to insure substantial uniformity of yarn tension throughout the entire weaving operation.

A further object is to provide means for applying braking force to a tufting yarn spool in such a way that the effective braking force diminishes in substantially direct ratio to the decrease in diameter of the yarn mass on the spool.

A further object is to provide spool braking means, supported by the clutch device which holds the tube frame during the weaving-in operation, which is operative to apply substantially the same braking force during the weaving-in operation to all spools on which the diameter of the yarn mass is the same, but wherein the effective braking force decreases as the diameter of the yarn mass on any given spool decreases.

A further object is to provide spool braking means for a tufting yarn spool, wherein the braking force is created by fluid pressure.

A further object is to provide a brake for a tufting yann spool wherein the braking force is created by fluid pressure and wherein such fluid pressure diminishes as the diameter of the yarn mass on the spool decreases.

A further object is to provide braking means for a tufting yarn spool wherein the braking force is created by fluid pressure and wherein the fluid pressure is varied by means including a part which moves once for each cycle of the spool carrying chains.

A further object is to provide braking means for a tufting yarn spool which may be adjusted manually as the weaving operation progresses, thereby to decrease the braking effect as the diameter of the yarn mass on the spool diminishes.

A further object is to provide braking means for a tufting yarn spool which may be adjusted manually to vary the braking force and wherein means is provided for indicating to the operator the proper adjustment in accordance with the amount of yarn remaining on the spool.

A further object is to provide braking means for a tufting yarn spool so devised that the effective braking force may be varied and wherein detector means, responsive to the diameter of the yarn mass on the spool, determines the effective braking force at any given instant during the weaving operation.

A further object is to provide means for varying the distance to which the tube frame moves upwardly for drawing yarn from the spool during the weaving-in cycle, thereby to insure that the same length of tufting yarn will be drawn off from the spool during each successive weaving-in cycle regardless of the diameter of the yarn mass.

Other and further objects and advantages of the invention will be pointed out in the following more detailed description and by reference to the accompanying drawings, wherein Fig. 1 is a diagrammatic front elevation of the right-hand end portion of a single tube frame disengaged from its carrier chains and engaged by the right-hand clutch device in readiness to perform the weaving-in operation;

Fig. 1ᵃ is a fragmentary front elevation, similar to Fig. 1, but with parts omitted and showing a spool brake as it is positioned before the tube frame is removed from the chains;

Fig. 2ᵃ is a partial diagrammatic view of clutch-device operating means as conventional in Axminster looms;

Fig. 3 is a fragmentary diagram illustrative of one desirable means for controlling the tufting yarn tension;

In order to make clear the problem to be solved, the cycle of operations involved in the introduction of a single bight of tufting yarn into the fabric is diagrammatically illustrated in Figs. 6 to 10, inclusive.

In these views, a single tube frame is diagrammatically indicated in end elevation at F; its endmost tube at T, with the lower end portion Y of a yarn depending from the tube; the breast beam of the loom is indicated at B; the reed at R; front and rear tuft cutters at C and C′; the tuft-turning comb at K; the fabric body-warps at W; and a shot of locking weft at E. The tufting yarn is shown to exaggerated size as compared with the other parts.

Figures 6, 7:
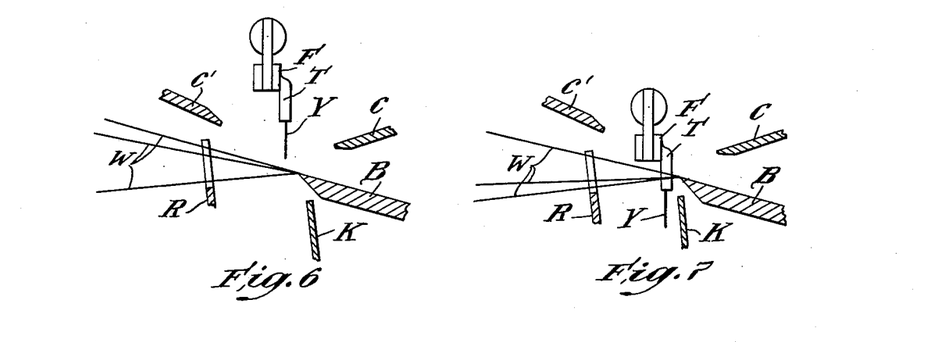
Figs. 6 to 10, inclusive, are diagrams illustrative of the sequence of steps involved in the weaving-in cycle.
Figures 8, 9:
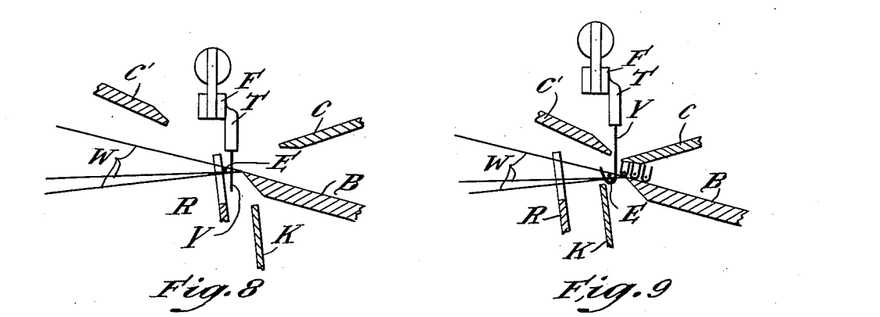
Figure 10:
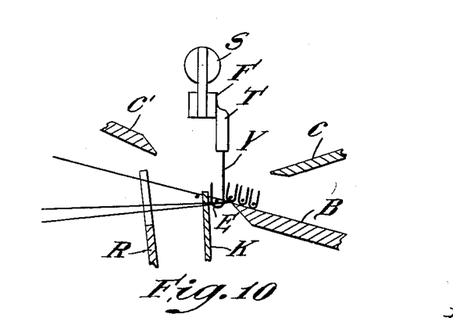

The "weaving-in cycle," as that term is here employed, comprises the following principal steps:

(1) The endless conveyor chains stop with a tube frame F at the weaving point;

(2) Clutch devices engage the opposite ends of the frame F and remove the latter from the chain (Fig. 6);

(3) The clutch devices move the tube frame F downwardly until its tube T projects down between the warps (Fig. 7), thus introducing the depending portion Y of the yarn between adjacent warps;

(4) The tube frame rises (Fig. 8) sufficiently to withdraw the tubes T from between the warps while leaving a sufficient length of the yarn end Y depending below the warps to form one leg of the tuft bight, and the locking weft or wefts E is shot through the shed and beaten up by the reed R so as to lock the depending end Y of the tufting yarn into the body of the fabric;

(5) The tube frame F now rises further (Fig. 9) so as to draw off yarn from the spool to provide enough to form the second leg of the tuft bight and to leave the desired yarn length extending for another tuft-presenting operation of the given frame when it is again brought around to the weaving point by the conveyor chains;

(6) The comb K (Fig. 10) lifts the end portion Y of the tuft yarn, which has been depending below the warps, upwardly through the warps into the tuft-forming position to form the first named leg of the tuft bight;

(7) The cutters C and C′ now sever the yarn between the second leg of the bight and the spool, at the same time trimming off the upper end of the first leg of the bight, if necessary;

(8) The clutch devices restore the tube frame F to the conveyor chain and the latter advances to bring the next tube frame into the weaving position.

Figure 2:
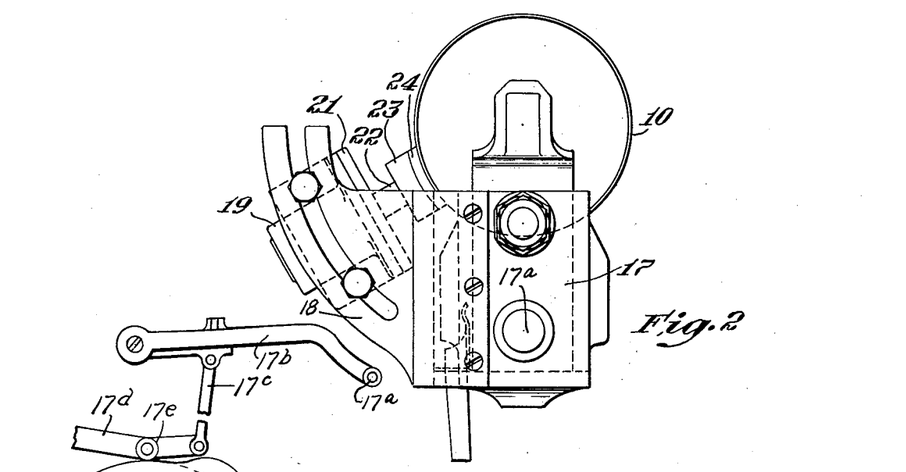
Fig. 2 is an end elevation of the parts shown in Fig. 1 viewed from the right-hand end of the tube frame.
Figures 15, 16:
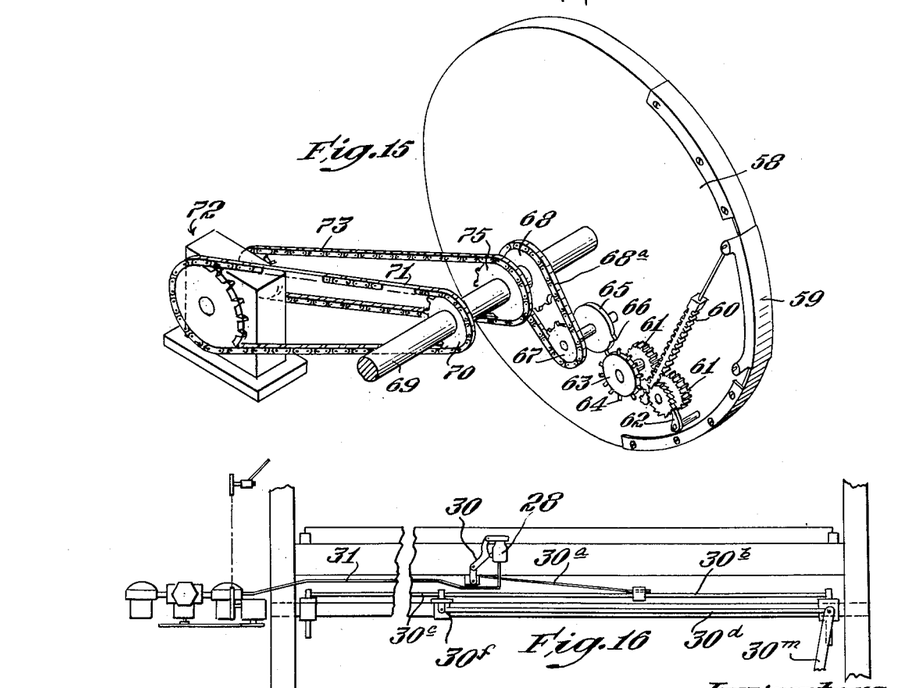
Fig. 15 is a perspective view illustrating another automatic means for controlling the tension of the yarn as the latter is drawn from the spool during the weaving-in cycle.
Fig. 16 is a diagrammatic rear elevation illustrating the means whereby the three-way valve is actuated.

In the foregoing steps in the "weaving-in cycle" as above outlined the motions of the tube-frame while held in the clutch-devices 17 later referred to are accomplished by the cam operating means of said clutch-devices as generally provided in Axminster looms, as diagrammed in Fig. 2ᵃ, showing the supporting stud 17ᵃ of the clutch-device 17 (see also Figs. 2 and 3) pivoted at the end of clutch-arm 17ᵇ connected by link 17ᶜ to lever 17ᵈ carrying the cam-engaging roll 17ᵉ riding on the clutch lifting and lowering cam 58′ on the loom cam shaft 69, the latter appearing also in Fig. 15.

It will be noted from the above that when the tuft yarn has been locked into the body fabric by the weft E (Fig. 8) the ensuing lift of the tube frame (Fig. 9) must draw off yarn from the spool S; if rotation of the spool be always opposed by the same braking force, the decreasing diameter of the yarn mass on the spool, as the weaving progresses, will make it more and more difficult for the yarn to turn the spool. This means a progressive increase in yarn tension. The more the yarn is tensioned, the more it will elastically stretch, and, in recovering after being cut off, will contract to an increasing degree so that shorter and shorter tufts will be produced.

Figures 1, 1A:
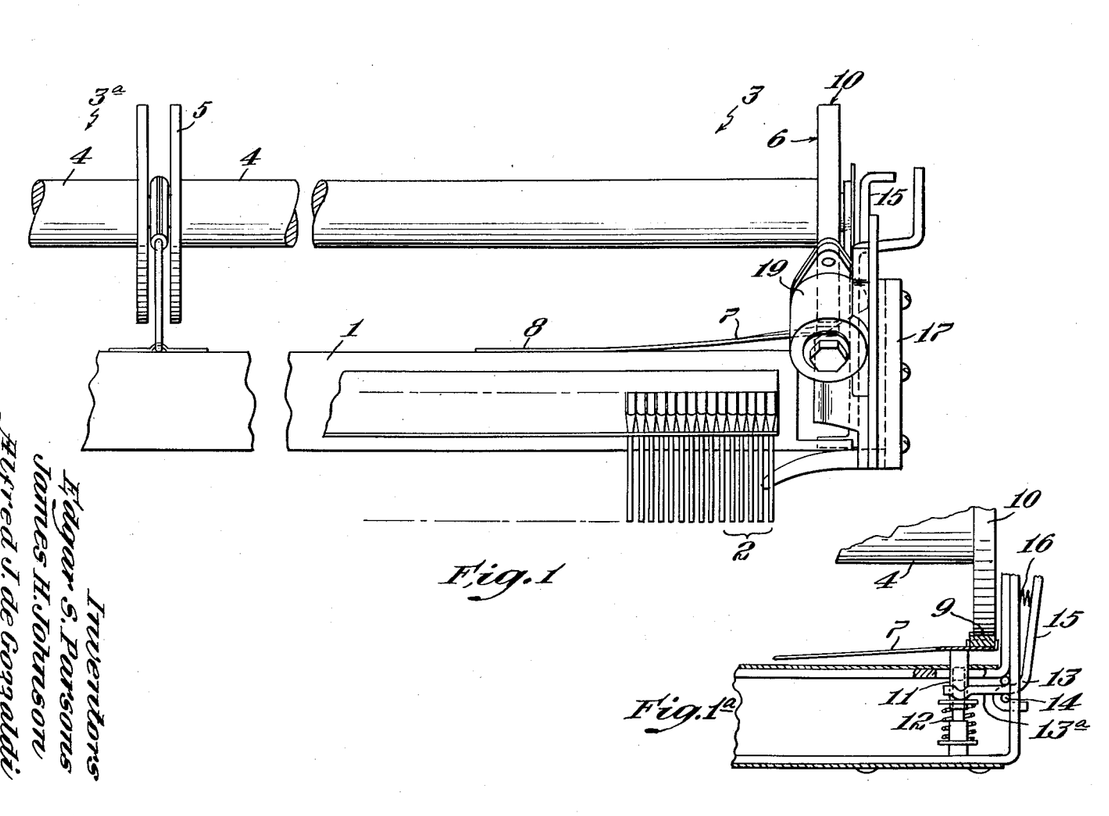

Referring to Fig. 1, the numeral 1 designates a tube frame of generally conventional type, only the right-hand portion of the frame being illustrated, together with some of its series of tubes which are indicated at 2. This frame supports a plurality of coaxial rotary spools 3, 3ᵃ, etc., each spool having a barrel 4 (on which tufting yarn is wound) and spaced heads 5 and 6, the tube frame having spaced bearings in which the spool spindle turns. As here illustrated (Figs. 1 and 1ᵃ) the tube frame carries a resilient brake supporting finger 7, fixed at 8 to the frame and at its free, right-hand end carrying the brake shoe 9. The parts are so arranged that the finger 7 tends to hold the brake shoe closely adjacent to but slightly spaced from the peripheral flange 10 of the spool head 6, the finger 7 being a mere support. A vertically movable pin 11 (Fig. 1ᵃ) is arranged to slide in guides, carried by the tube frame, the upper end of this pin being immediately below the free end portion of the finger 7. A coiled compression spring 12 urges the pin upwardly so that it normally raises the free end of the finger 7 so as to press the brake shoe against the spool flange 10, thereby preventing free rotation of the spool. A bell crank lever 13 (Fig. 1ᵃ) having a substantially horizontal arm 13ᵃ which overlies the upper end of the compression spring, is pivoted at 14 on the tube frame, the lever also having an upright arm 15, which is normally urged outwardly away from the spool head 6 by a spring 16. The clutch device 17, which takes the tube frame from the conveyor chain, has a part which engages the arm 15 and rocks the latter to the position shown in Fig. 1 so as to press its arm 13ᵃ down onto the upper end of the spring 12, thus compressing the spring so that the finger 7 is free to hold the brake shoe 9 spaced from the flange of the spool head, the brake 9 thus automatically becoming inactive at the time when the tube frame is removed from the conveyor chain.

Figure 4:
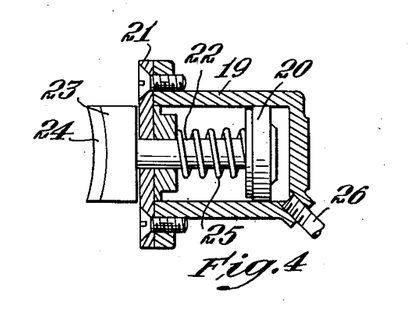
Fig. 4 is a vertical section through a brake actuating cylinder employed in accordance with one embodiment of the invention.
Figure 5:
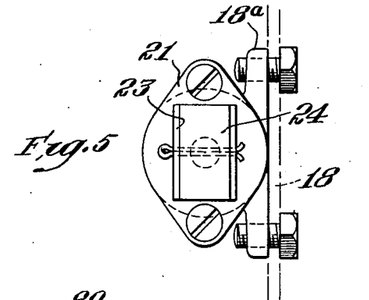
Fig. 5 is an end elevation of the brake actuating cylinder viewed from the right-hand side of Fig. 4.

In accordance with the present invention, the clutch device 17 (only that clutch device which is at the right-hand end of the tube frame being shown) carries a bracket 18 (Figs. 2 and 5) to which the base 18ª of a pressure fluid motor is adjustably secured. This motor has a cylinder 19 (Fig. 4) within which a piston 20 slides. The piston rod 22 has a sliding fit in a center opening in the removable cylinder head 21 and carries a brake shoe 23 at its end outside of the cylinder. Desirably, the brake shoe has a concave outer face, to which a resilient pad 24 is secured. The parts are so arranged that when the piston rod is pushed outwardly, the pad 24 contacts the peripheral surface of the flange 10 (Figs. 1 to 3) of the spool head, thus acting as a brake to oppose rotation of the spool. A coiled spring 25 urges the piston to the right (Fig. 4) so as to move the brake pad away from the spool flange.

At its right-hand end (Fig. 4) the cylinder 19 has a port in which is fixed one end of a tube 26, through which pressure fluid may be delivered to the cylinder. It may be noted that the clutch device at the opposite end of the tube frame is provided with a brake device, such as that just above described, and that a tube 26ª, Fig. 3, leads thereto.

The tubes 26 and 26ª (Fig. 3) extend from a T-connection 27, which receives pressure fluid from a three-way valve 28, having a stem 29 which is moved in one direction by a lever 30 and in an opposite direction by a spring not shown, this valve being of conventional type. The control lever 30 for valve 28 is actuated by a link 30ª (Figs. 3 and 16) which is connected to one of the clutch actuating rods 30ᵇ (the other clutch actuating rod being indicated at 30ᶜ (Fig. 16)). The two rods, as is customary in looms of this type, are connected to the opposite ends respfectively of a lever 30ᶠ which is oscillated by a bar 30ᵈ which is moved back and forth by a cam actuated rocker 30ᵐ.

Figures 2A, 3:
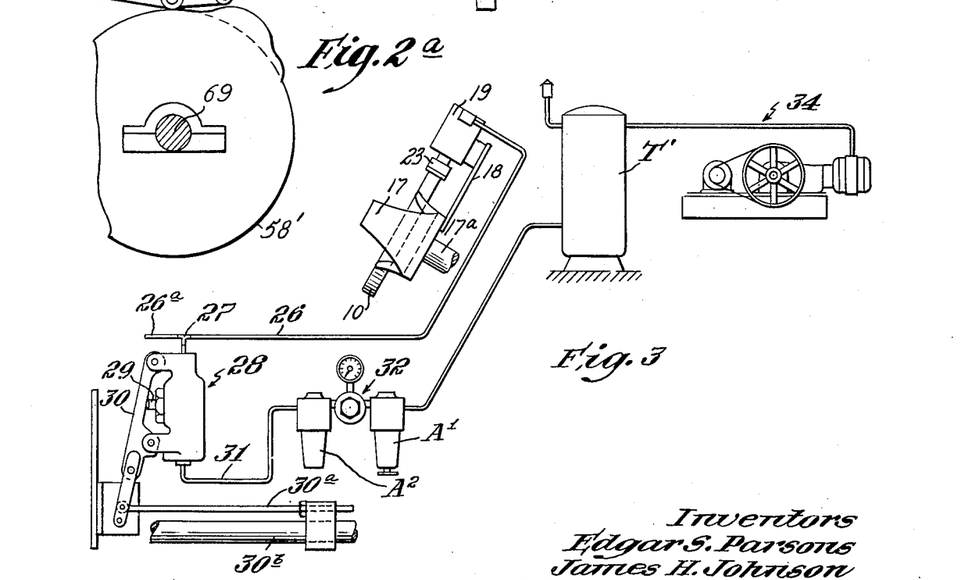

Pressure fluid is admitted to the valve 28 through a pipe 31. In one position of the valve stem 29, pressure fluid (gaseous or liquid) is admitted to the pipes 26 and 26ª and thence to the brake cylinders, whereby the pistons of the brake cylinders are moved to apply braking force to the spool heads. In another position of the valve stem 29, pressure fluid is cut off from the supply pipe 31 and is exhausted from the brake cylinders, whereupon the springs 25 retract the piston rods and thus move the brake pads away from the spool heads.

Pressure fluid, for example air, is supplied to the pipe 31 through a pressure regulator 32, to which the pressure fluid is delivered from a tank T' in which the pressure is built up by a compressor 34. As shown an air filter A¹ and an air lubricator A² are arranged at opposite sides, respectively, of the regulator 32.

Figure 11:
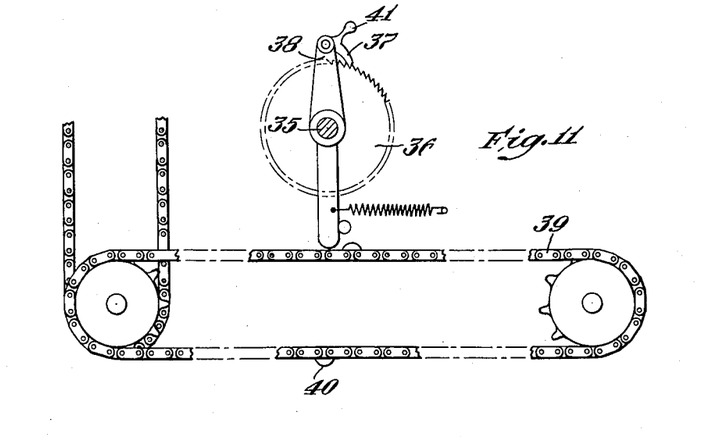
Fig. 11 is a fragmentary elevation illustrating one means for turning the shaft of the pressure-reducing device used in the arrangement of Fig. 3.

The pressure regulator is of a conventional type having a rotary pressure-adjusting shaft 35 (Fig. 11). In accordance with the present invention, this shaft is slowly turned during the weaving operation so as gradually to reduce the pressure of the fluid delivered to the brake cylinders. Thus, as the diameter of the yarn mass on the spool decreases, the force applied by the brake is reduced at a rate such as to compensate for the shortening lever arm through which the yarn acts in turning the spool. In this manner, substantially uniform yarn tension is maintained from the start to the finish of the weaving operation.

In one embodiment of the invention (Fig. 11) the pressure-adjusting shaft 35 of the pressure reducer is provided with a ratchet wheel 36, which is moved forward step-by-step by a pawl 37. This pawl is carried by a lever 38 rocking on the shaft 35 and which is rocked in a direction to advance the ratchet wheel by appropriate means, for example, by an endless chain 39 having lugs 40 so arranged as to rock the lever 38 as a lug passes beneath it. It may be noted that it is only necessary to vary the pressure once for each cycle of the spool carrying chains. Thus the chain 39 is driven in time with the chain which supports the spools by any suitable motion transmitting mechanism. The pawl 37, if desired, may be provided with a handle 41, by means of which it may be disengaged from the ratchet wheel to permit the shaft 35 to be adjusted by hand, if desired, at the starting of the weaving operation.

Figures 12, 17:
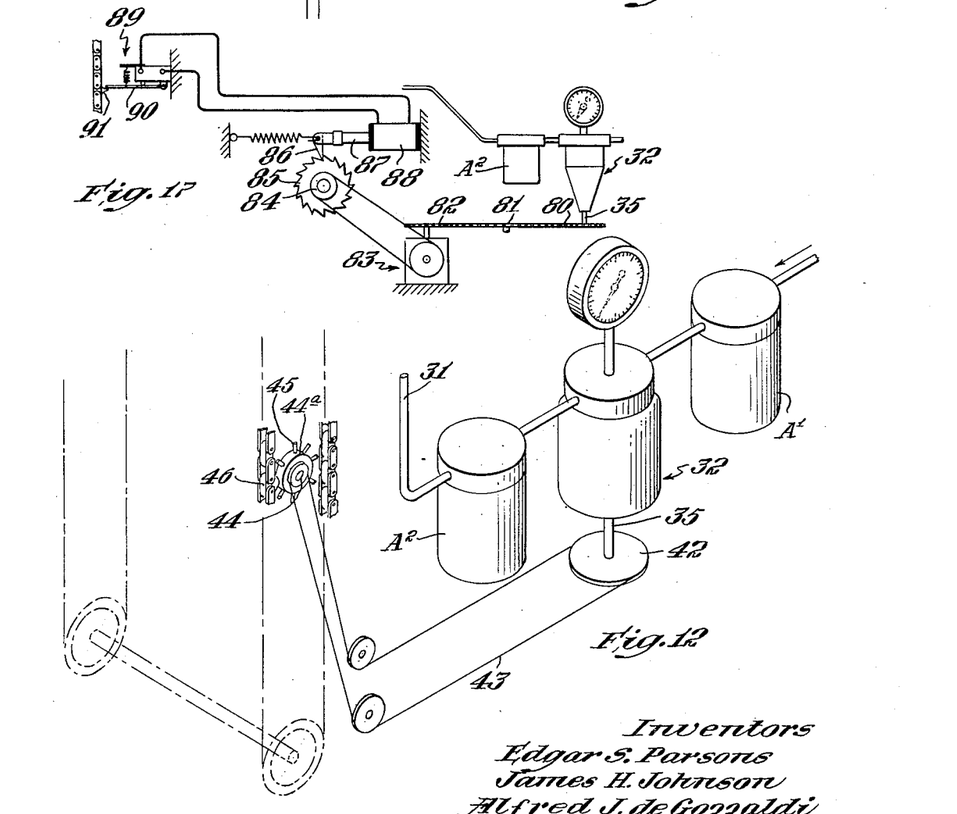
Fig. 12 is a diagrammatic elevation illustrative of another means for turning the shaft of the pressure reducer.
Fig. 17 is a diagrammatic elevation illustrative of a modified means for regulating the brake applying pressure.

Instead of using a pawl and ratchet device for turning the pressure-adjusting shaft, the latter may, as illustrated in Fig. 12, be provided with a sprocket wheel 42, which is driven by a chain 43, which passes over a sprocket 44 fixed to a wheel 44ª provided with radial fingers 45, so located as to be contacted by a lug 46 carried by one of the chains which carry the spools. Thus, as the spool supporting chains progress, the pressure-adjusting shaft will be turned through a certain angle for each cycle of the chains.

Instead of varying the brake pressure by the action of the spool carrying chains, detector means may be provided, for example detector means including a feeler which touches the yarn mass on the spool and, in response to the diameter of the yarn mass, determines the brake pressure.

Figure 13:
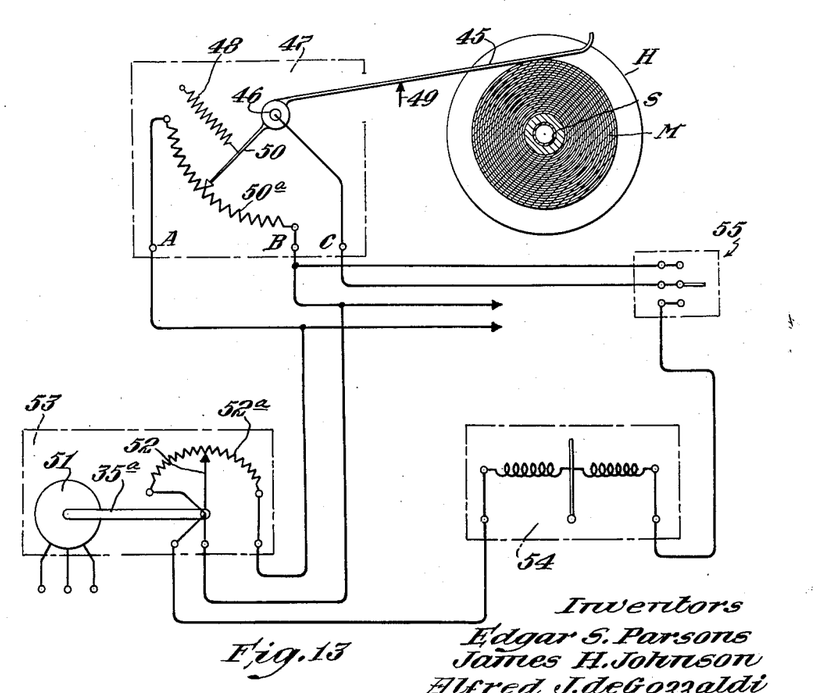
Fig. 13 is a diagram illustrative of means for varying the brake pressure in direct response to the position of a feeler which contacts the yarn on the spool.

Fig. 13 diagrammatically illustrates one such arrangement. The spindle of one spool (which may be any spool of the series) is indicated at S; the spool head at H; the yarn mass on the spool at M, and the detector finger at 45. This detector finger, at least that portion of it which contacts the yarn mass, should be of substantial width so that it will engage at least several adjacent yarns at the same time, and desirably should be very light in weight. As indicated diagrammatically, this finger is pivoted at 46 within the casing of a potentiometer 47 which is mounted on a fixed part of the loom frame and in a position such that the finger 45 may contact the yarn mass on a spool still supported by the chains and while the chain is stationary. A spring 48 tends to swing the finger 45 into contact with the yarn mass, but, except during the actual feeling operation, the finger is held out of operative position by a part 49, diagrammatically indicated at 46, but which is retracted to allow the finger to swing downwardly against the yarn mass, when the chain stops, by any appropriate means, for example by the action of a part (not shown) carried by one of the clutch devices, or by a cam, or other appropriate means, moving in timed relation to the chain. The swinging arm 50 of the potentiometer is connected to the detector finger 45 so as to rock with the latter. In this instance, the shaft 35ª of the pressure regulator is the shaft, or is geared to the shaft, of a reversible induction motor 51.

When using this arrangement, it is desirable that the total variation in fluid pressure may be made by turning the shaft of the pressure regulator through an angle of less than 360°, for example 180°. The motor shaft 35ª carries the swinging arm 52 of a second potentiometer 53, preferably built into the motor casing. The potentiometers 47 and 53 are so associated that, as the arm 50 moves along the coil 50ª, the arm 52 moves along the coil 52ª, the two potentiometers being connected as voltage dividers across the same source of potential. For any given position of arm 50 there will be a corresponding position of arm 52, at which the two arms will be equi-potential. When this position is attained by the turning of arm 50, no current will flow through the coil of polarized relay 54 and the motor 51 will stop. Thus, as the feeler 45 moves in response to decreasing size of the yarn mass M, the motor shaft will be turned intermittently, thus adjusting the shaft 35ª of the pressure regulator so as to decrease the brake force applied to the spool. A hand switch 55 may be provided for discontinuing automatic operation if desired.

Figure 14:
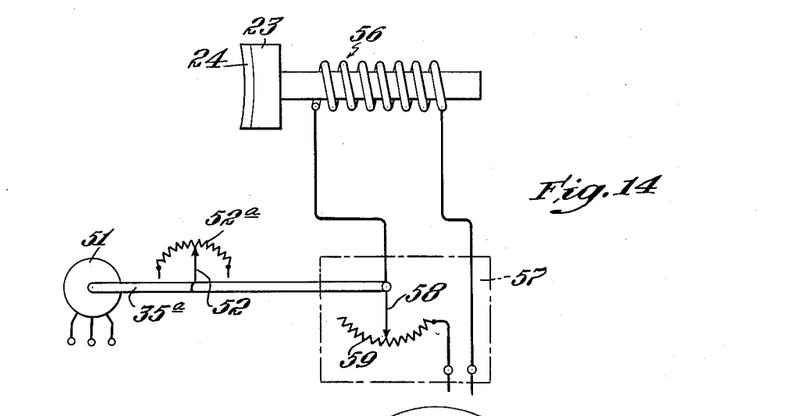
Fig. 14 is a diagram illustrative of a magnetic type of brake and the means for operating it.

This feeler and associated control may be employed with a magnetic brake, as well as with a fluid pressure brake. Thus, as illustrated diagrammatically in Fig. 14, the coil of a solenoid 56 of the push-out type is supplied with current by a circuit, including a rheostat 57, having a moving arm 58, carried by a shaft 35$^a$ which moves along the coil 59, thereby varying the electro-motive force supplied to the solenoid. Thus, as the motor shaft 35$^a$ slowly turns during the weaving operation, the force for energizing the solenoid gradually diminishes and thus the brake pressure applied to the spool flange by the brake shoe 23 likewise diminishes.

In this connection, it may also be observed that the magnetic brake arrangement may be controlled in the same way as the pressure brake, for example, by rocking the shaft which carries the rheostat arm 58 by means of a pawl and ratchet device as in Fig. 11. It is thus obvious that the desired reduction in resistance to turning of the spool may be attained by the use of various automatic acting mechanisms.

It is further contemplated that the adjustment of the brake pressure may be made manually, for example, by turning the shaft of the pressure regulator by hand at suitable intervals. To facilitate such a mode of operation, it may be convenient to provide a signal device of some type, for instance a clock mechanism (not shown) arranged to ring a bell or flash a light at the proper intervals to inform the operator that the time has arrived for adjusting the shaft of the pressure regulator.

Fig. 17 illustrates a further means for actuating the pressure regulating valve. In this arrangement the valve stem 35 is provided with a sprocket wheel 80 which is turned by a chain 81 embracing a second sprocket wheel 82 on the delivery shaft of a speed-reducing mechanism 83. Power is transmitted to the drive shaft of the speed-reducing mechanism 83 by a sprocket chain passing about a sprocket wheel 84 to which a ratchet wheel 85 is fixed. This ratchet wheel is driven by a pawl 86 carried by the reciprocating core 87 of a solenoid 88, the core being urged to the left (Fig. 17) by a spring so as to retract the pawl. The current supplied to the coil of the solenoid is controlled by a switch 89 which may, for example be of the "micro" type having an actuating arm 90 which is arranged in the path of a lug 91 carried by one of the frame carrying chains. During each cycle of operation of this chain, the lug engages the arm 90 thus closing the switch and completing the solenoid circuit. The core 87 of the solenoid is thus moved to the right (Fig. 17) moving the pawl so as to advance the ratchet wheel one tooth and thus through the speed reduction mechanism, turning the valve stem 35 a small amount, thus reducing the pressure available for actuating the spool-retarding brake.

It is also contemplated that somewhat equivalent effects may be obtained as respects uniformity of tuft production by means which does not vary the braking pressure. This may be accomplished, for example, as illustrated in Fig. 15 by adjustment of the cam device which controls the lifting of the tube frame during the weaving-in cycle. This cam device is a common feature of Axminster looms (see Fig. 2$^a$) and is here illustrated as comprising the disk 58 which is provided with an adjustable lift element or waste patch 59 which is pivotally secured to the disk 58 and is automatically adjusted relatively to the disk in accordance with the present invention by a double-faced rack 60, whose opposite faces are engaged by spur pinions 61 turning on studs carried by the disk 58. A pawl 62 prevents rotation of one of these pinions in the reverse direction. A disk 63 having radial arms 64 is fixed to the other pinion. A disk 65, turning on a stud carried by the cam disk 58, has a lug 66 which, by engagement with one of the arms 64, turns the disk 63 and thus turns the spur pinions intermittently.

The disk 65 is fixed to a sprocket wheel 67. A second sprocket wheel 68 (loose on the shaft 69 which carries the cam disk 58) drives the sprocket wheel 67 by means of a chain 68$^a$. A sprocket wheel 70, fixed to the shaft 69, drives a chain 71 which operates a speed-reduction mechanism 72 of conventional type which, by means of a sprocket chain 73, turns a sprocket wheel 75 fast to the sprocket wheel 68. The cam disk 58 makes 100,000 revolutions during the exhaustion of the yarn on one set of spools and the speed ratio is such that, during that time, the disk 65 makes only 5 revolutions. Thus during the depletion of the yarn on one set of spools, the waste patch 59 is adjusted five times so as correspondingly to increase the lift of the tube frame during the weaving-in operation. Thus, the length of yarn drawn off from the spool gradually increases as the weaving operation progresses. Assuming that, by means of a brake such as has customarily been employed, e.g. brake 7, 9 of Fig. 1$^a$, continuously engaged the resistance to turning of the spool is uniform during the weaving operation, the increase in lift of the tube frame compensates for the decreasing lever arm with which the yarn acts to turn the spool and thus uniformity of tufting length is insured.

While various means of attaining uniformity in tuft length in an Axminster loom have herein been illustrated and described by way of example, it is understood that the invention is broadly inclusive of any and all modifications falling within the terms of the appended claims.

We claim:

1. That method of weaving Axminster fabric, wherein tuft forming portions of yarn are drawn off and severed from lengths of tuft yarn, collectively forming a substantially cylindrical yarn mass on a rotary spool carried by a tube frame, said method comprising as steps, applying braking force to prevent free rotation of the spool while the latter is being moved through a customary weaving-in cycle and, at each successive weaving-in cycle during the entire weaving operation so applying said rotation retarding force to the spool and applying a determined amount of lift to the tube frame, and so variably controlling one of said steps of retarding-force-applying and of tube-frame-lift-applying in relation to the decrease of yarn on the spool, that each tuft forming portion of yarn, after severance from the yarn mass on the spool and regardless of the amount of yarn on the spool, is of substantially the same predetermined length.

2. That method of weaving Axminster fabric, wherein tuft forming portions of yarn are drawn off and severed from lengths of tuft yarn collectively forming a substantially cylindrical yarn mass on a rotary spool carried by a tube frame, which method comprises as steps applying force to resist rotation of a spool carrying a mass of tufting yarn, and progressively decreasing said force in proportion to decrease in the diameter of the yarn mass as the weaving operation progresses.

3. In combination in a loom of the Axminster type wherein tube frames, each carrying a rotary yarn mass, are moved in succession by a conveyor toward the weaving point, clutch devices operative to remove the foremost tube frame of the series from the conveyor at the weaving point and to move the tube frame through a weaving-in cycle, and power-actuated brake means on the clutch devices and operative with respect to the rotary yarn mass to impose substantially the same degree of tension upon the yarn ends depending from the tube frame as they are drawn off from the spool during the weaving-in operation regardless of the diameter of the yarn mass carried by the tube frame.

4. In combination, in an Axminster loom of the kind in which endless, intermittently moving chains support a series of tube frames each carrying a spool of tufting yarn and wherein as each frame arrives at the weaving point, it is removed by clutch devices from the chains and caused to perform a weaving-in cycle during which yarn is withdrawn from its spool, after which the frame is restored to the chains, means operative to prevent free rotation of the spool as the frame performs the weaving-in cycle, tube frame clutch devices and cam operating means therefor to effect performance of each weaving-in cycle including tube frame lifting for yarn draw-off, and control means for so variably controlling one of said means that the length of yarn drawn off and severed from the mass on the spool during each successive weaving-in cycle is controlled to be substantially constant regardless of the progressive decrease in diameter of the yarn mass on the spool as the weaving progresses.

5. In combination, in an Axminster loom of the kind in which endless intermittently moving chains support a series of tube frames each carrying a spool of tufting yarn and wherein as each frame arrives at the weaving point, it is removed from the chains and caused to perform a weaving-in cycle during which yarn is withdrawn from its spool, after which the frame is restored to the chains, means operative to apply force to retard rotation of the spool as the frame performs the weaving-in cycle, and means for so varying during determined weaving-in cycles the spool retarding force that the length of yarn drawn off from the spool during each successive weaving-in cycle is substantially constant throughout the weaving operation.

6. In combination, in an Axminster loom of the kind wherein a series of tube frames, each carrying a spool of tufting yarn, is advanced intermittently so as to present each tube frame in succession at the weaving point, means for moving each tube frame through a weaving-in cycle when it is at the weaving point, means for applying braking force to resist rotation of the spool during the weaving-in cycle, and means operative to decrease the effective braking force progressively as the diameter of the yarn mass on the spool diminishes.

7. In combination, in a loom of the Axminster type wherein tube frames each carrying a rotary yarn mass are moved in succession by a conveyor toward the weaving point and having clutch devices operative to remove the foremost tube frame of the series from the conveyor and to move the tube frame through a weaving-in cycle, means carried by the clutch device to apply braking force to the yarn mass during the weaving-in cycle, the brake applying means being so constructed and arranged and being equipped with such a control that the tension imposed on the yarn and attendantly the length of yarn drawn off from the rotary mass in each weaving cycle is substantially the same regardless of the diameter of the yarn mass.

8. In combination, in an Axminster loom of the kind in which endless intermittently moving chains support a series of tube frames each carrying a spool of tufting yarn and wherein as each frame arrives at the weaving point, it is removed from the chains and caused to perform a weaving-in cycle during which yarn is withdrawn from its spool, after which the frame is restored to the chains, brake means which tends to retard rotation of the spool as the frame performs the weaving in cycle, a motor for actuating the brake means, and means for so varying the action of the motor that the length of yarn drawn off from the spool during each successive weaving-in cycle is substantially constant throughout the weaving operation.

9. In combination in a loom of the Axminster type wherein tube frames each carrying a rotary yarn mass are moved in succession by a conveyor toward the weaving point and having clutch devices operative to remove the foremost tube frame of the series from the conveyor and to move the tube frame through a weaving-in cycle, a brake for opposing rotation of the yarn mass during the weaving-in cycle, said brake comprising a fluid pressure motor and means for varying the braking force delivered by the motor in substantially direct ratio to the diameter of the yarn mass.

10. In combination, in a loom of the Axminster type wherein an endless conveyor intermittently advances a series of tube frames toward the weaving point and wherein each tube frame has a rotatable spool provided with a barrel and heads and which supports a yarn mass comprising a plurality of separate yarns, all of substantially the same length, and wherein clutch devices engage the opposite ends, respectively, of the foremost tube frame of the series while the conveyor dwells, removes the tube frame from the conveyor, moves the tube frame through a weaving-in cycle, and restores the tube frame to the conveyor, brake means carried by one at least of the clutch devices for applying braking force to the spool during the weaving-in cycle, and means for controlling the braking means during determined cycles so that the same length of yarn is delivered from the spool during the weaving-in cycle regardless of the diameter of the yarn mass on the spool.

11. In combination, in a loom of the Axminster type wherein an endless conveyor intermittently advances a series of tube frames toward the weaving point and wherein each tube frame has a rotatable spool provided with a barrel and heads and which supports a yarn mass comprising a plurality of separate yarns, all of substantially the same length and wherein clutch devices engage the opposite ends, respectively, of the foremost tube frame of the series while the conveyor dwells, removes the tube frame from the conveyor, moves the tube frame through a weaving-in cycle, and restores the tube frame to the conveyor, brake means carried by one at least of the clutch devices for applying braking force to the spool during the weaving-in cycle, the braking means comprising a brake shoe engageable with the head of the spool, and means whereby the frictional pressure applied by the brake shoe to the spool is diminished as the diameter of the yarn mass on the spool decreases.

12. In combination, in a loom of the Axminster type wherein an endless conveyor intermittently advances a series of tube frames toward the weaving point and wherein each tube frame has a rotatable spool provided with a barrel and heads and which supports a yarn mass comprising a plurality of separate yarns, all of substantially the same length and wherein clutch devices engage the opposite ends, respectively, of the foremost tube frame of the series while the conveyor dwells, removes the tube frame from the conveyor, moves the tube frame through a weaving-in cycle, and restores the tube frame to the conveyor, brake means carried by one at least of the clutch devices for applying braking force to the spool during the weaving-in cycle, the braking means comprising a brake shoe engageable with the head of the spool, and automatic means operative to diminish the braking pressure as the diameter of the yarn mass on the spool decreases.

13. In combination, in a loom of the Axminster type according to claim 12 wherein a fluid pressure motor actuates the brake shoe, and means operative to diminish the effective force applied by the motor to the brake shoe as the diameter of the yarn mass on the spool diminishes.

14. The combination, in a loom of the Axminster type according to claim 12 wherein the braking means comprises a movable brake shoe supported by the clutch device, and a fluid pressure motor having a cylinder and a piston, means for transmitting motion from the piston to the brake shoe, and means for gradually diminishing the effective pressure of the fluid in the motor cylinder as the diameter of the yarn mass on the spool decreases.

15. The combination, in a loom of the Axminster type according to claim 12, wherein the braking means comprises a bracket fixed to each of the respective clutch devices, a brake shoe fixed at one end of a rod slidable in each respective bracket, motor means for moving each rod thereby to press the respective brake shoes against spool heads, and means for so controlling the motor means that the pressure applied by the brake shoe to the spool heads diminishes as the diameter of the yarn mass decreases.

16. In combination, in a loom of the Axminster type wherein an endless conveyor intermittently advances a series of tube frames toward the weaving point and wherein each tube frame has a rotatable spool provided with a barrel and heads and which supports a yarn mass comprising a plurality of separate yarns, all of substantially the same length and wherein clutch devices engage the opposite ends, respectively, of the foremost tube frame of the series while the conveyor dwells, removes the tube frame from the conveyor, moves the tube frame through a weaving-in cycle, and restores the tube frame to the conveyor, brake means carried by one at least of the clutch devices for applying braking force to the spool during the weaving-in cycle, the braking means comprising a bracket fixed to the clutch device, a fluid pressure motor carried by the bracket, the motor comprising a cylinder and a piston slidable therein, a brake shoe engageable with the spool head, means for transmitting motion from the piston to the brake shoe, means for delivering pressure fluid to the cylinder, thereby to move the piston, and means for decreasing the pressure of the pressure fluid as the diameter of the yarn mass on the spool decreases.

17. In an Axminster loom of the kind wherein intermittently moving chains carry a series of tube frames, each provided with a rotary spool of tufting yarn, to a weaving point where each successive tube frame is moved through a weaving-in cycle while the chains temporarily dwell, a brake for retarding the rotation of the spool while the tube frame is performing the weaving-in cycle, a pressure motor for actuating the brake, means including a pressure reducing valve having an actuating stem for supplying pressure fluid to the motor, and means actuated by one of the chains for slowly moving the stem of the pressure-reducing valve so as to reduce the effective pressure of the fluid supply to the motor as the weaving operation progresses.

18. The combination, in an Axminster loom according to claim 17 wherein the means for moving the stem of the pressure reducing valve comprises a ratchet wheel and a pawl for turning it, and means actuated by one of said chains for moving the pawl at predetermined intervals.

19. The combination in an Axminster loom according to claim 17 wherein the pressure-reducing valve has a rotary stem, means for turning the valve stem, including a ratchet wheel and a pawl for advancing the latter, a solenoid for moving the pawl, a switch for controlling the supply of current to the solenoid, and means carried by one of the chains for closing the switch at predetermined intervals.

20. In an Axminster loom according to claim 4, the construction and arrangement in which said variably controlling means comprises electro-magnetic means for retarding the rotation of the spool as the frame performs the weaving-in cycle, and automatic means for progressively diminishing the effective electro-magnetic force as the diameter of the yarn mass on the spool diminishes.

21. In an Axminster loom according to claim 4, the construction and arrangement in which said variably controlling means comprises a brake for retarding rotation of the spool while the tube frame is performing the weaving-in cycle, electro-magnetic means for actuating the brake, and means operative gradually to diminish the electro-magnetic braking force as the weaving operation progresses.

22. The combination, in an Axminster loom according to claim 21 having means for so varying the current supplied to said electro-magnetic means that the length of yarn drawn off and severed from the yarn mass on the spool during each successive weaving-in cycle is substantially constant throughout the weaving operation.

23. In an Axminster loom of the kind wherein one-after-another of a series of tube frames, each carrying a rotatable spool of tufting yarn, is moved through a weaving-in cycle when it arrives at the weaving point, braking means for retarding rotation of the spool during the weaving-in cycle, a feeler engageable with the yarn mass on the spool and whose position varies with the diameter of the yarn mass, and means responsive to the position of the feeler for varying the spool retarding force applied by the brake means.

24. In an Axminster loom of the kind wherein one-after-another of a series of tube frames, each carrying a rotatable spool of tufting yarn, is moved through a weaving-in cycle when it arrives at the weaving point, braking means for retarding rotation of the spool during the weaving-in cycle, detector means which is sensitively responsive to variations in the diameter of the yarn mass on the spool, and wherein the brake means is magnetically operated, and means controlled by the response of the detector means to variations in yarn mass diameter for varying the magnetic force effective to actuate the brake means.

25. In an Axminster loom of the kind wherein one-after-another of a series of tube frames, each carrying a rotatable spool of tufting yarn moved through a weaving-in cycle when it arrives at the weaving point, braking means for retarding rotation of the spool during the weaving-in cycle, a feeler, engageable with the yarn mass on the spool, whose position varies with the diameter of the yarn mass and wherein the brake means is actuated by a pressure motor, the pressure fluid for operating the motor being supplied to the motor by means including a pressure-reducing valve having a rotary valve stem, and means for determining the position of said stem in accordance with the position of the feeler.

26. In an Axminster loom according to claim 4, the construction and arrangement in which said variably controlling means comprises means for progressively increasing the lift of the tube frame for drawing off yarn from the spool as the diameter of the yarn mass on the spool decreases.

27. In an Axminster loom according to claim 4, the construction and arrangement in which said variably controlling means comprises means for so progressively increasing the lift of the tube frame, effective for drawing off yarn from the spool during the weaving-in cycle, that the length of yarn drawn off and severed from the mass on the spool during each successive weaving-in cycle is substantially constant throughout the weaving operation.

28. In an Axminster loom according to claim 4, the construction and arrangement wherein said operating means for the tube frame clutch devices comprises a rotary cam having an adjustable lift element, and said variably controlling means comprises means for progressively adjusting the lift element of the rotary cam as the weaving operation progresses, thereby to increase the lift of the tube frame for drawing off yarn from the spool as the diameter of the yarn mass on the spool decreases.

29. In an Axminster loom according to claim 4, the construction and arrangement in which said variably controlling means comprises automatic means for so varying the effective throw of said cam operating means that the length of yarn drawn off and severed from the mass on the spool, during each successive weaving-in cycle, is substantially constant throughout the weaving operation.

30. That method of weaving Axminster fabric wherein tuft forming portions of yarn are drawn off and severed from lengths of tuft yarn collectively forming a substantially cylindrical yarn mass on a rotary spool carried by a tube frame, which method comprises the steps of applying force to resist rotation of a spool carrying a mass of tufting yarn, in each weaving cycle effecting yarn draw-off by lift of the spool-carrying frame, and from time to time during determined weaving cycles varying one of said rotation resisting and frame lifting steps with respect to effective length of yarn draw-off so as to compensate for decreasing yarn mass on the spool and thereby to maintain substantially the same length for drawn-off tuft-forming yarn portions throughout the weaving.

31. The method according to claim 30 wherein the yarn draw-off compensating variation is by decreasing the spool rotation resisting force.

32. The method according to claim 30 wherein the yarn draw-off compensating variation is by increasing the lift of the spool-carrying frame.

33. In combination, in an Axminster loom of the kind wherein a series of tube frames, each carrying a spool of tufting yarn, is advanced intermittently so as to present each tube frame in succession at the weaving point, means for moving each tube frame through a weaving-in cycle when it is at the weaving point, means for applying braking force to resist rotation of the spool during the weaving-in cycle, means to lift the given tube frame in each weaving cycle to draw off a tuft-forming portion of yarn, and control means for one of said means such that from time to time during the weaving cycles said one means is adjusted with respect to effective yarn draw-off thereby to compensate for decreasing of the mass on the spool and to maintain uniform length for the drawn-off tuft yarns.

34. In an Axminster loom according to claim 33 the construction and arrangement wherein the control means is effective upon the braking force applying means to decrease resistance to spool rotation.

35. In an Axminster loom according to claim 33, the construction and arrangement wherein the control means is effective upon the frame lift means to increase the lift.

References Cited in the file of this patent

UNITED STATES PATENTS

| | | |
|---|---|---|
| 495,847 | Stiner | Apr. 18, 1893 |
| 543,080 | Clark | July 23, 1895 |
| 1,436,619 | Alvord | Nov. 21, 1922 |
| 1,845,614 | Mason | Feb. 16, 1932 |
| 2,518,158 | Marcy | Aug. 8, 1950 |